(12) United States Patent
White

(10) Patent No.: US 10,358,215 B2
(45) Date of Patent: Jul. 23, 2019

(54) AIRCRAFT PAYLOAD LAUNCH SYSTEM

(71) Applicant: BAE Systems plc, London (GB)

(72) Inventor: Andrew Charles White, Preston Lancashire (GB)

(73) Assignee: BAE Systems plc, London (GB)

( * ) Notice: Subject to any disclaimer, the term of this patent is extended or adjusted under 35 U.S.C. 154(b) by 63 days.

(21) Appl. No.: 15/736,813

(22) PCT Filed: Jun. 21, 2016

(86) PCT No.: PCT/GB2016/051855
§ 371 (c)(1),
(2) Date: Dec. 15, 2017

(87) PCT Pub. No.: WO2016/207623
PCT Pub. Date: Dec. 29, 2016

(65) Prior Publication Data
US 2018/0362163 A1 Dec. 20, 2018

(30) Foreign Application Priority Data

Jun. 22, 2015 (EP) .................................... 15250014
Jun. 22, 2015 (GB) .................................... 1510953.1

(51) Int. Cl.
*B64D 1/10* (2006.01)
*B64D 1/02* (2006.01)
*B64D 7/08* (2006.01)
*B64D 1/06* (2006.01)

(52) U.S. Cl.
CPC ................. *B64D 1/10* (2013.01); *B64D 1/02* (2013.01); *B64D 1/06* (2013.01); *B64D 7/08* (2013.01)

(58) Field of Classification Search
CPC ..................................... B64D 1/10; B64D 7/08
See application file for complete search history.

(56) References Cited

U.S. PATENT DOCUMENTS

| | | | |
|---|---|---|---|
| 2,802,396 | A | 8/1957 | Montgomery |
| 2,949,094 | A | 8/1960 | Clothier |
| 4,489,638 | A | 12/1984 | Bastian et al. |
| 5,222,996 | A | 6/1993 | Marshall et al. |
| 8,276,305 | B1 | 10/2012 | Leutenegger et al. |
| 2008/0099622 | A1 | 5/2008 | Yoffe |
| 2013/0221158 | A1 | 8/2013 | Binkholder et al. |

FOREIGN PATENT DOCUMENTS

| | | |
|---|---|---|
| DE | 2822355 A1 | 12/1984 |
| EP | 1375345 A1 | 1/2004 |
| EP | 2532588 A1 | 12/2012 |

(Continued)

OTHER PUBLICATIONS

International Preliminary Report on Patentability of International Application No. PCT/GB2016/051854, dated Dec. 26, 2017, 7 pages.

(Continued)

*Primary Examiner* — Brian M O'Hara
*Assistant Examiner* — Keith L Dixon
(74) *Attorney, Agent, or Firm* — Maine Cernota & Rardin

(57) ABSTRACT

An aircraft (2) comprising a launch tube (14) extending along at least part of a length of a wing of the aircraft (2), and through which an item (24) may be launched from the aircraft (2). The launch tube (14) comprises an opening (22) at a distal end of the wing (6).

18 Claims, 1 Drawing Sheet

(56) References Cited

FOREIGN PATENT DOCUMENTS

| | | |
|---|---|---|
| GB | 214685 A | 5/1924 |
| GB | 2025009 A | 1/1980 |
| GB | 2124570 A | 2/1984 |
| GB | 2499897 A | 9/2013 |
| WO | 2015034557 A1 | 3/2015 |
| WO | 2015145426 A1 | 10/2015 |

OTHER PUBLICATIONS

International Preliminary Report on Patentability of International Application No. PCT/GB2016/051855, dated Dec. 26, 2017, 7 pages.
International Search Report and Written Opinion of International Application No. PCT/GB2016/051855, dated Sep. 29, 2016, 10 pages.
Search Report under Section 17(5) of Great Britain Application No. GB1510953.1, dated Dec. 10, 2015, 3 pages.
European Search Report of European Application No. EP15250014.6, dated Dec. 1, 2015, 7 pages.
International Search Report and Written Opinion of International Application No. PCT/GB2016/051854, dated Sep. 20, 2016, 11 pages.
Search Report under Section 17(5) of Great Britain Application No. GB1510951.5, date Dec. 10, 2015, 5 pages.
European Search Report of European Application No. EP15250013.8, dated Nov. 27, 2015, 7 pages.

AIRCRAFT PAYLOAD LAUNCH SYSTEM

RELATED APPLICATIONS

This application is a national phase application filed under 35 USC § 371 of PCT Application No. PCT/GB2016/051855 with an International filing date of Jun. 21, 2016 which claims priority of GB Patent Application 1510953.1 filed Jun. 22, 2015 and EP Patent Application 15250014.6 filed Jun. 22, 2015. Each of these applications is herein incorporated by reference in its entirety for all purposes.

FIELD OF THE INVENTION

The present invention relates to aircraft and the launch therefrom of payloads carried by the aircraft.

BACKGROUND

Planform alignment is used in the design of many stealth, or "Low Observable" (LO) (i.e. low detectability by radar systems), aircraft. Planform alignment involves using a small number of surface orientations in the shape of the structure of the aircraft. For example, leading and trailing edges of the aircraft wing, tail surfaces of the aircraft, and surface of other aircraft structures (such as intakes and apertures) may be set to be the same angle. This is done to so that the aircraft reflects radar signals that are detectable only in very specific directions relative to the aircraft, rather than returning a radar signal that may be detected at many different angles.

LO aircraft may be used to carry payloads. Payloads tend to be carried by LO aircraft in internal storage bays. This tends to reduce the radar signature of the payload and maintain the low radar visibility properties of the aircraft.

Deployment of payloads by LO aircraft commonly involves the opening and closing of powered doors on an underside of the aircraft. Such opening and closing of powered doors may be performed while the aircraft is travelling at high speeds.

SUMMARY OF THE INVENTION

In a first aspect, the present invention provides an aircraft comprising a launch tube extending along at least part of a length of a wing of the aircraft and through which an item may be launched from the aircraft. The launch tube comprises an opening at a distal end of the wing.

Consequently, a component of a direction of the launch tube is parallel to a lateral axis of the aircraft. The component of the direction of the launch tube that is parallel to the lateral axis of the aircraft may be greater than a component of the direction of the launch tube that is parallel to a longitudinal or roll axis of the aircraft.

The component of the direction of the launch tube that is parallel to the lateral axis of the aircraft may be greater than a component of the direction of the launch tube that is parallel to a normal or yaw axis of the aircraft.

The component of the direction of the launch tube that is parallel to the lateral axis of the aircraft may have a greater order of magnitude than a component of the direction of the launch tube that is parallel to a longitudinal or roll axis of the aircraft.

The component of the direction of the launch tube that is parallel to the lateral axis of the aircraft may have a greater order of magnitude than a component of the direction of the launch tube that is parallel to a normal or yaw axis of the aircraft.

The launch tube may extend along the entire of a length of a wing of the aircraft.

The launch tube may be substantially parallel to an external surface of the aircraft.

The launch tube may be substantially parallel to a leading edge of the wing of the aircraft or a trailing edge of the wing of the aircraft. More preferably, the launch tube is substantially parallel to both leading edge of a wing of the aircraft and the trailing edge of that wing of the aircraft.

The opening may be at or proximate to a tip of a wing of the aircraft.

The aircraft may further comprise a closure closing the opening, wherein the closure is substantially flush with an external surface of the aircraft.

The aircraft may further comprising a closure closing the opening, wherein the closure is a retractable closure configured to open the opening when the item is being launched from the aircraft and close the opening when the item is not being launched from the aircraft.

The aircraft may further comprising a closure closing the opening, wherein the closure is a frangible closure configured to break upon the item impacting with the closure.

The aircraft may further comprise a cold gas prolusion system configured to launch an item along the launch tube.

The aircraft may further comprise a storage bay for storing the item. The storage bay may comprise an opening through which the item may be loaded into the storage bay. The opening of the storage bay may be located in an upper surface of the aircraft. One or more edges (e.g. each edge) of the opening of the storage bay may be substantially parallel to an external surface of the aircraft.

The aircraft may further comprise a wadding removal device located in the launch tube, the wadding removal device being configured to remove wadding from the item moving along the launch tube.

The aircraft may further comprise the item, the item being configured to be launched along the launch tube, wherein the item is an item selected from the group of items consisting of: a missile, a rocket, a bomb, a pyrotechnic device, and a sonobuoy.

DETAILED DESCRIPTION

Figure 1:
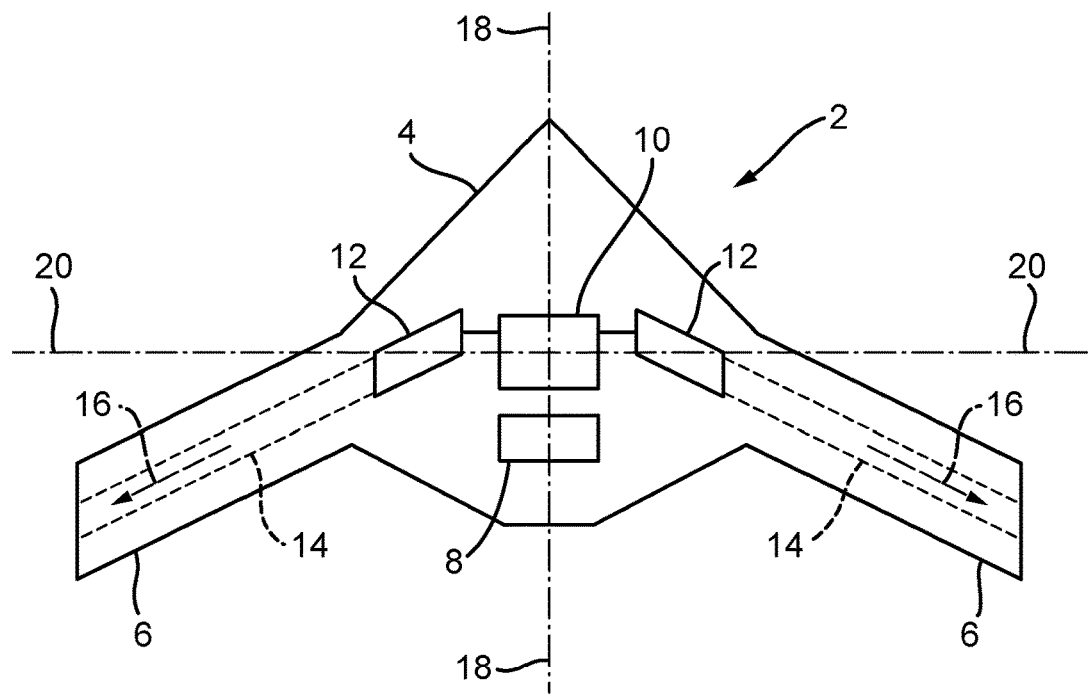
FIG. 1 is a schematic illustration (not to scale) of a top view of an example aircraft in which an embodiment of a missile launch system is implemented.

FIG. 1 is a schematic illustration (not to scale) of a top view of an example aircraft 2 in which an embodiment of a missile launch system is implemented.

In this embodiment, the aircraft 2 is a manned aircraft. However, in other embodiments, the aircraft 2 is an unmanned or autonomous aircraft.

In this is embodiment, the aircraft 2 is a "Low Observable" (LO) aircraft, i.e. an aircraft that is relatively difficult to detect using radar systems. In this embodiment, the principle of planform alignment has been used in the design of the shape of the aircraft 2, i.e. there are a relatively small number of different orientations of the surfaces, in particular the edges, of the aircraft structure compared to the number of different surface orientations in aircraft that are not Low Observable aircraft. In this embodiment, the leading edges of the aircraft wing are at the same angle as the edges of the trailing surfaces of the aircraft 2. Other structures, such as an air intake bypass doors and a re-fuelling aperture, also use the same angles as the aircraft wing/tail portions. The effect of planform alignment is that only radar radiation (emitted by a radar antenna) that is incident onto the aircraft 2 at a small number of specific angles (i.e. normal to the angles of orientation of the surfaces of the aircraft) is reflected back towards the radar antenna, whereas radar radiation that is incident onto the aircraft 2 at an angle other than one or those specific angles tends to be reflected away from the radar antenna. This is in contrast to aircraft that are not Low Observable aircraft. The edges presented by such non-Low Observable aircraft are dominated by other design principles, such as their aerodynamic characteristics, tend to comprise a broader variety of angles and would typically reflect incident radar radiation in many directions so that that aircraft is detectable at many angles. Thus, the aircraft 2 tends only to be "visible" to radar systems when it is at certain, very specific angles relative to the radar antenna of that system.

In this embodiment, the external surface of the aircraft 2 is made of or is coated in a radar-absorbent material (RAM) such as a foam absorber. The RAM that forms the external skin of the aircraft 2 tends to have relatively low electrical conductivity e.g. compared to the material that forms the aircraft frame.

In this embodiment, the aircraft 2 comprises a fuselage section 4, two wings 6, a processor 8, a launch module 10, two missile storage bays 12, and two launch tubes 14.

In this embodiment, the aircraft fuselage 6 is a portion of the aircraft that houses aircraft systems including, but not limited to an aircraft undercarriage, avionics systems, environmental control systems, a cockpit. In this embodiment, the fuselage 4 houses the processor 8, the missile launch module 10, and the two missile storage bays 12.

The aircraft wings 6 are located on opposite sides of the aircraft fuselage 4. In this embodiment, the aircraft wings 6 have a primary purpose of generating lift for the aircraft 2. The aircraft wings 6 have aerofoil shaped cross section. When viewed from above, the aircraft wings 6 have substantially uniform thickness such that a leading edge of an aircraft wing 6 has substantially the same orientation as the trailing edge of that aircraft wing 6. This alignment of the leading and trailing edges of each aircraft wing 6 tends to reduce the visibility of the aircraft 2 to radar systems.

The processor 8 is located in the aircraft fuselage 4. The processor 8 is coupled to the missile launch module 10. The processor 8 is configured to control operation of the missile launch module 10.

The missile launch module 10 is located in the aircraft fuselage 4. The missile launch module 10 is coupled to the missile storage bays 12. The missile launch module 10 is configured to, under control of the processor 8, propel or launch a missile stored in a missile storage bay 12 along a launch tube 14 connected to that missile storage bay 12, and away from the aircraft 2. Directions in which missiles are launched along the launch tubes 14 are indicated in the Figures by arrows and the reference numerals 16.

In this embodiment, the missile launch module 10 comprises a cold gas propulsion system for launching the missiles. This use of pressurised cold gas to propel the missiles away from the aircraft 2 advantageously tends to provide for reduced temperature inside the launch tubes 14 compared to, for example, using a pyrotechnic motor of a missile to propel the missile along the launch tube 14. Furthermore, the motor of the missile may be activated once the missile is remote from the aircraft 2, i.e. after the missile has been ejected from the aircraft 2. This advantageously tends to provide that the aircraft 2 is not impinged upon by a missile plume when that missile is launched from the aircraft 2. Thus, damage to the aircraft 2 caused by the missile plume tends to be reduced. Furthermore, the deposition of radar-visible particulate matter contained within the missile plume onto an outer surface of the aircraft 2 tends to be reduced.

Each of the missile storage bays 12 is located in the fuselage 6 in this embodiment but they may, in another embodiment be located in the region of a root of each respective wing 6. Each of the missile storage bays 12 is configured to store one or more missiles. Any appropriate type or types of missile may be loaded into the missile storage bays 12. Each missile storage bay 12 is connected to a respective launch tube 14 such that a missile stored in that missile storage bay 12 may be launched from that missile storage bay 12 along the connected launch tube 14.

Each missile storage bay 12 comprises a respective opening through which a missile may be loaded into that missile storage bay 12. The openings of the missile storage bays 12 may be sealed by panels. In this embodiment, the edges of the openings of the missile storage bays 12, and/or the aircraft panels that seal those openings, are substantially parallel to one or more surfaces of the aircraft 2. For example, in this embodiment, for each storage bay 12, the leading and trailing edges of the opening of that missile storage bay 12, and the leading and trailing edges of the aircraft panels that seals that opening, are parallel to the leading and trailing edges of a respective aircraft wing 6. Also for example, for each storage bay 12, the edges of that opening to that storage bay 12 that connect together the leading and trailing edges of that opening, and the corresponding edges of the aircraft panels that seals that opening, are parallel to a tip of a respective aircraft wing 6. This tends to improve the low observability of the aircraft 2.

In this embodiment, the openings of the missile storage bays 12 are located on an upper surface of the aircraft 2. Locating the missile store openings on the upper surface of the aircraft 2 advantageously tends to reduce visibility of these openings to, for example, ground-based radar systems while the aircraft 2 is in flight. Furthermore, locating the missile storage bay openings on the upper surface of the aircraft 2 advantageously tends to reduce conflict of the missile storage bays 12 with landing gear provision.

In this embodiment, each launch tube 14 extends along a respective aircraft wing 6. Each launch tube 14 may be substantially parallel to the leading and trailing edges of the aircraft wing 6 in which that launch tube 14 is located.

In this embodiment, each launch tube 14 is oriented to align with wing spars of the aircraft wing 6 in which that launch tube 14 is located. This advantageously tends to provide that the structural strength of the aircraft wings 6 is not significantly affected by the presence of the launch tubes 14. Thus, reinforcement of the aircraft wings 6 tends not to be needed, thereby reducing weight of the aircraft wings 6.

A longitudinal, or roll, axis of the aircraft 2 is indicated in FIG. 1 by a dotted line and the reference numeral 18. The longitudinal axis 18 of the aircraft 2 passes through the aircraft 2 from nose to tail. A lateral, or pitch, axis of the aircraft 2 is indicated in FIG. 1 by a dotted line and the reference numeral 20. The lateral axis 20 of the aircraft 2 passes through the aircraft 2 from one wing tip to the opposite wing tip. The longitudinal axis 18 is perpendicular to the lateral axis 20.

In this embodiment, for each launch tube 14, a component of the direction in which that launch tube 14 points is parallel to the lateral axis 20.

In this embodiment, for each launch tube 14, the projection of that launch 14 tube onto the lateral axis 20 is longer than the projection of that launch 14 tube onto the longitudinal axis 18. In some embodiments, for each launch tube 14, the projection of that launch 14 tube onto the lateral axis 20 has a greater order of magnitude than the projection of that launch 14 tube onto the longitudinal axis 18.

In this embodiment, for each launch tube 14, the projection of that launch 14 tube onto the lateral axis 20 is longer than the projection of that launch 14 tube onto the normal, or yaw, axis of the aircraft 2. In some embodiments, for each launch tube 14, the projection of that launch 14 tube onto the lateral axis 20 has a greater order of magnitude than the projection of that launch 14 tube onto the normal axis of the aircraft.

Each launch tube 14 connects a respective aircraft storage bay 12 to the tip of the aircraft wing 6 in which that launch tube 14 is located.

Figure 2:
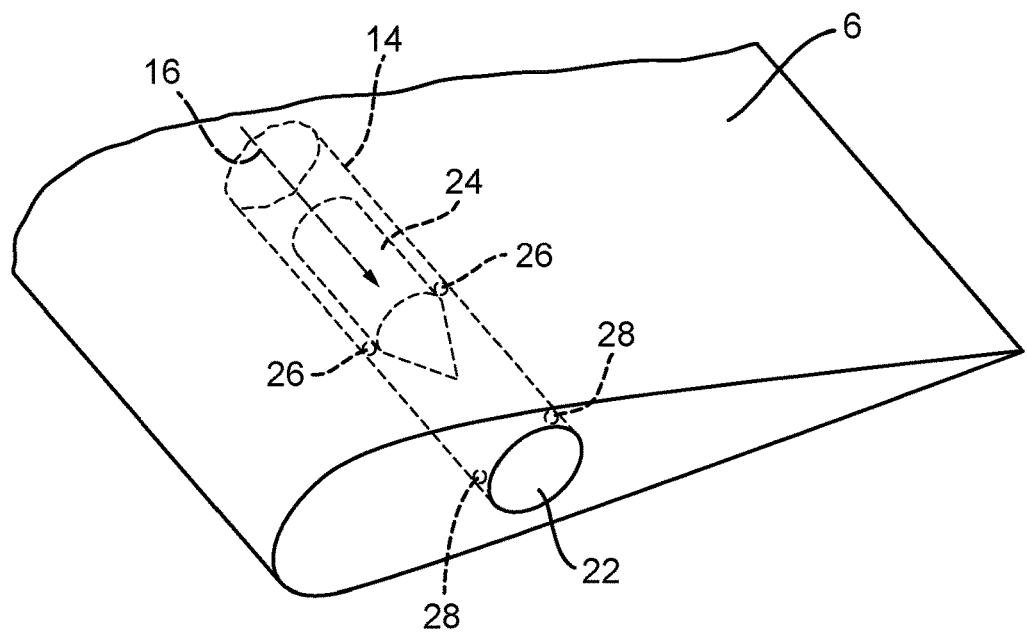
FIG. 2 is a schematic illustration (not to scale) showing further details of a wing tip of the aircraft.

FIG. 2 is a schematic illustration (not to scale) showing further details of a portion of the aircraft 2 proximate to a tip of an aircraft wing 6. The aircraft wing 6 is an aerofoil.

In this embodiment, an opening of the launch tube 14, hereinafter referred to as the "launch tube opening" and indicated in FIG. 2 by the reference numeral 22, is located at or proximate to the tip of the aircraft 6.

In operation, a missile 24 is propelled, by the missile launch module 10, along the launch tube 14, out of the launch tube opening 22, and away from the aircraft 2.

In this embodiment, wadding 26 is used to seal the cold gas used by the missile launch module 10 behind the missile 24, thereby improving efficiency of the missile launch module 10.

In this embodiment, the aircraft 2 further comprises one or more cutting devices 28. The cutting devices 28 are located in the launch tube 14 at or proximate to the launch tube opening 22. The cutting devices 28 are configured to, as the missile 24 exits the launch tube 14, separate the wadding 26 from the missile 24. The cutting devices 28 may fragment the wadding 26 as the missile 24 passes through the launch tube opening 22.

In this embodiment, the aircraft 2 further comprises a retractable cover over the launch tube opening 22.

The retractable cover is configured to close the launch tube opening 22 when the missile launch system is not in use, i.e. when the missile 24 is not being launched. When the retractable cover closes the launch tube opening 22, an external surface of the retractable cover is substantially flush with an external surface of the aircraft skin at the wing tip. Thus, low observability properties of the aircraft 2 tend to be preserved when the missile launch system is not in use. Furthermore, a likelihood of blockage of the launch tube opening 22 when the missile launch system is not in use, for example by Foreign Object Debris (FOD) tends to be reduced or eliminated.

The retractable cover is configured to open the launch tube opening 22 when the missile launch system is in use, i.e. when the missile 24 is being launched. The retractable cover may be retracted so as to not obstruct the launch tube opening 22, thereby allowing passage of the missile 24 from the missile storage bay 12 to the outside of the aircraft 2.

The retractable cover is configured to close the launch tube opening 22 after the missile 24 has been launched from the aircraft 2.

The missile 24 may include fins or other stabilising means. The fins or stabilising means may be configured to deploy after launch of the missile 24 from the aircraft 2, i.e. after the missile 24 is remote from aircraft 2.

Thus a missile launch system is provided.

Advantageously, the above described missile launch system is particularly useful for use with aircraft stores or payloads that are suitable for being launched by tube.

Advantageously, having openings to the aircraft storage bays elongate in the aircraft's lateral dimension tends to facilitate the alignment of the edges of those openings with aircraft surfaces. In contrast, if openings to the aircraft storage bays are elongate in the aircraft's longitudinal dimension, aligning the edges of those openings to aircraft surfaces tends to provide the openings have more complex shapes. Thus, providing low observability properties to the aircraft tends to be facilitated.

For many conventional aircraft, the deployment of a payload from that aircraft typically involves the rapid opening and closing of powered door panels on a lower surface of the aircraft, often at relatively high aircraft speed. Powerful actuators tend to be required to open and close the door panels into the air stream at high aircraft speeds. Furthermore, when a large storage bay on the aircraft is opened at high aircraft speed, the aircraft tends to experience very high acoustic and aerodynamic loads. Furthermore, the opening of door panels while the aircraft is in flight, into the air stream, tends to adversely affect that stability of the aircraft and tends to hinder control of the aircraft.

Advantageously, the above described missile launch system tends to reduce or eliminate use of such door panels. Thus, the powerful actuators used for opening the door panels may be omitted, thereby reducing aircraft weight.

Furthermore, the acoustic and aerodynamic loads experienced by the aircraft when deploying a payload tend to be reduced.

Furthermore, the above described missile launch system tends not destabilise or hinder control of the aircraft. This may be, at least in part, due to the above described missile launch system not including doors or panels that are opening into the air stream.

In the above embodiments, each aircraft wing has substantially uniform cross section along its length, i.e. from where that wing attached to the aircraft fuselage to the wing tip. This advantageously tends to facilitate installation of the launch tube of the missile launch system. However, in other embodiments, one or more aircraft wing has non-uniform cross section along its length. For example, in some embodiments, an aircraft wing may, when viewed from above for example, taper to a point at its tip.

In the above embodiments, a missile is launched from the aircraft. However, in other embodiments, a different type of aircraft store or payload is launched from the aircraft instead of or in addition to a missile. The terminology "aircraft store" and "payload" is used interchangeably herein to refer to any device or item intended for internal or external carriage and mounted on or in the aircraft. The item may be intended to be separated in flight from the aircraft. Aircraft stores may be expendable, i.e. an aircraft store may be configured to be separated from the aircraft in flight. Examples of expendable stores include, but are not limited to, missiles, rockets, bombs, sonobuoys, or unmanned air vehicles (UAVs). Alternatively, an aircraft store may be non-expendable, i.e. an aircraft store which is not normally separated from the aircraft in flight.

In the above embodiments, the aircraft includes retractable covers over the launch tube openings. However, in other embodiments, the aircraft does not include retractable covers over the launch tube openings. For example, in some embodiments, one or more of the launch tube openings may be covered by a frangible cover that is broken upon launch of the payload. Also for example, in some embodiments, one or more of the launch tube openings are covered by an openable and closable door panels. Such door panels may be configured to open outwards from the aircraft, i.e. into the air stream, or may be configured to open inwardly. In some embodiments, one or more of the launch tube openings are uncovered.

The invention claimed is:

1. An aircraft (2) comprising:
    a launch tube (14) extending along at least part of a length of a wing (6) of the aircraft (2) and through which an item (24) may be launched from the aircraft (2), the launch tube (14) comprising an opening (22) at a distal end of the wing (6); and
    the aircraft (2) further comprising a cold gas propulsion system configured to launch the item (24) along the launch tube (14).

2. The aircraft (2) according to claim 1, wherein the launch tube (14) extends along the whole length of the wing (6) of the aircraft (2).

3. The aircraft (2) according to claim 1, wherein the launch tube (14) is substantially parallel to a leading edge of the wing (6) of the aircraft (2) and/or a trailing edge of the wing (6) of the aircraft (2).

4. The aircraft (2) according to claim 1, wherein the opening (22) is at or proximate to a tip of the wing (6) of the aircraft (2).

5. The aircraft (2) according to claim 1, the aircraft (2) further comprising a closure closing the opening (22), wherein the closure is substantially flush with an external surface of the aircraft (2).

6. The aircraft (2) according to claim 1, the aircraft (2) further comprising a closure closing the opening (22), wherein the closure is a closure selected from the group of closures consisting of:
    a retractable closure configured to open the opening (22) when the item (24) is being launched from the aircraft (2) and close the opening (22) when the item (24) is not being launched from the aircraft (2); and
    a frangible closure configured to break upon the item (24) impacting with the closure.

7. An aircraft (2) comprising:
    a launch tube (14) extending along at least part of a length of a wing (6) of the aircraft (2) and through which an item (24) may be launched from the aircraft (2), the launch tube (14) comprising an opening (22) at a distal end of the wing (6); and
    the aircraft (2) further comprising a storage bay (12) for storing the item (24), the storage bay (12) comprising an opening through which the item (24) may be loaded into the storage bay (12), the opening of the storage bay being located in an upper surface of the aircraft (2).

8. The aircraft (2) according to claim 7, wherein the launch tube (14) extends along the whole length of the wing (6) of the aircraft (2).

9. The aircraft (2) according to claim 7, wherein the launch tube (14) is substantially parallel to a leading edge of the wing (6) of the aircraft (2) and/or a trailing edge of the wing (6) of the aircraft (2).

10. The aircraft (2) according to claim 7, wherein the opening (22) is at or proximate to a tip of the wing (6) of the aircraft (2).

11. The aircraft (2) according to claim 7, the aircraft (2) further comprising a closure closing the opening (22), wherein the closure is substantially flush with an external surface of the aircraft (2).

12. The aircraft (2) according to claim 7, the aircraft (2) further comprising a closure closing the opening (22), wherein the closure is a closure selected from the group of closures consisting of:
    a retractable closure configured to open the opening (22) when the item (24) is being launched from the aircraft (2) and close the opening (22) when the item (24) is not being launched from the aircraft (2); and
    a frangible closure configured to break upon the item (24) impacting with the closure.

13. An aircraft (2) comprising:
    a launch tube (14) extending along at least part of a length of a wing (6) of the aircraft (2) and through which an item (24) may be launched from the aircraft (2), the launch tube (14) comprising an opening (22) at a distal end of the wing (6); and
    the aircraft (2) further comprising the item (24), the item (24) being configured to be launched along the launch tube (14), wherein the item (24) is an item selected from the group of items consisting of: a missile, a rocket, a bomb, a pyrotechnic device, and a sonobuoy.

14. The aircraft (2) according to claim 13, wherein the launch tube (14) extends along the whole length of the wing (6) of the aircraft (2).

15. The aircraft (2) according to claim 13, wherein the launch tube (14) is substantially parallel to a leading edge of the wing (6) of the aircraft (2) and/or a trailing edge of the wing (6) of the aircraft (2).

16. The aircraft (2) according to claim 13, wherein the opening (22) is at or proximate to a tip of the wing (6) of the aircraft (2).

17. The aircraft (2) according to claim 13, the aircraft (2) further comprising a closure closing the opening (22), wherein the closure is substantially flush with an external surface of the aircraft (2).

18. The aircraft (2) according to claim 13, the aircraft (2) further comprising a closure closing the opening (22), wherein the closure is a closure selected from the group of closures consisting of:
    a retractable closure configured to open the opening (22) when the item (24) is being launched from the aircraft (2) and close the opening (22) when the item (24) is not being launched from the aircraft (2); and
    a frangible closure configured to break upon the item (24) impacting with the closure.

* * * * *